M. G. DE SIMONE.
KEYBOARD MECHANISM.
APPLICATION FILED SEPT. 30, 1914.
1,318,135.
Patented Oct. 7, 1919.
5 SHEETS—SHEET 1.
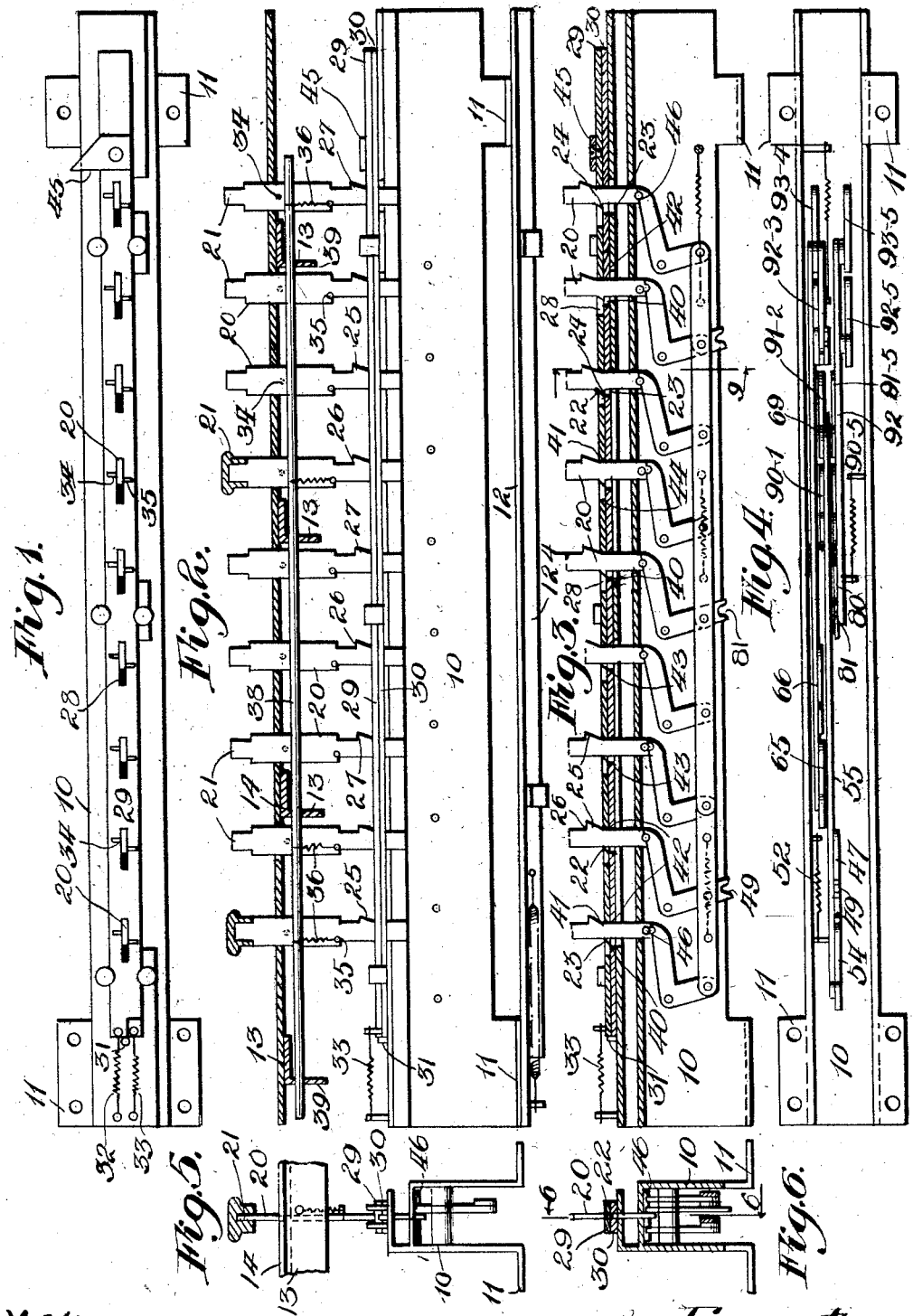

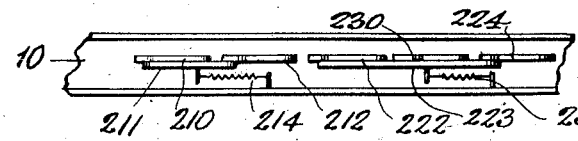
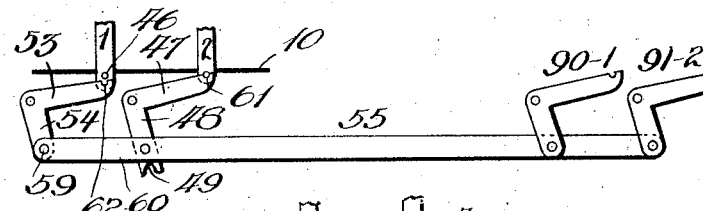
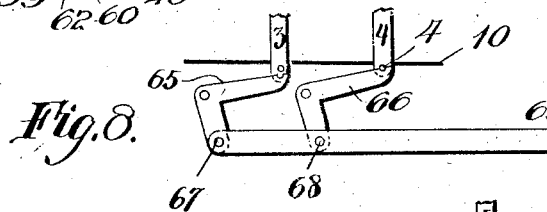
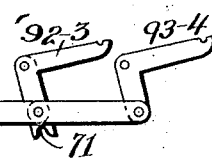
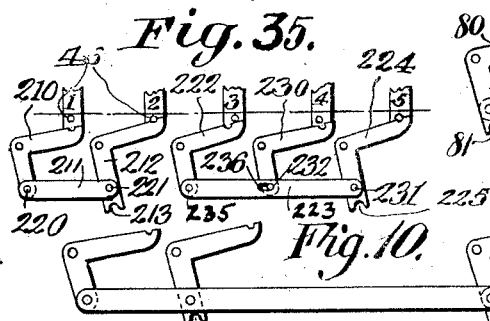
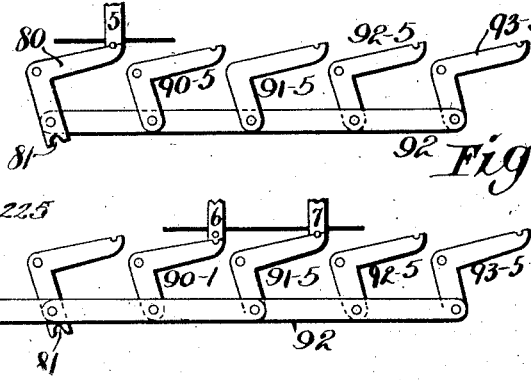
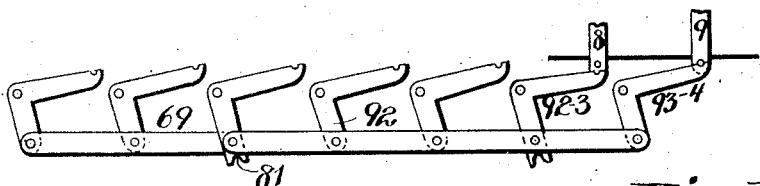
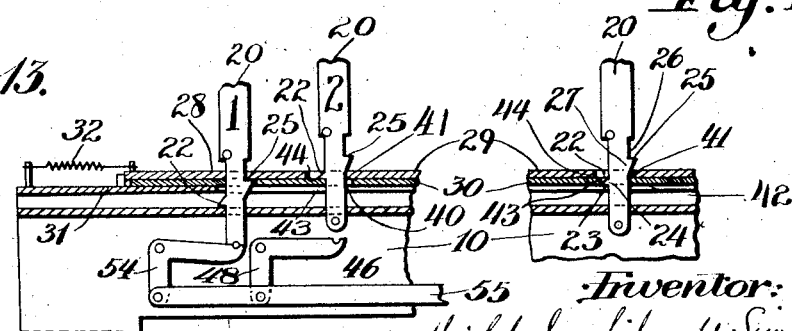

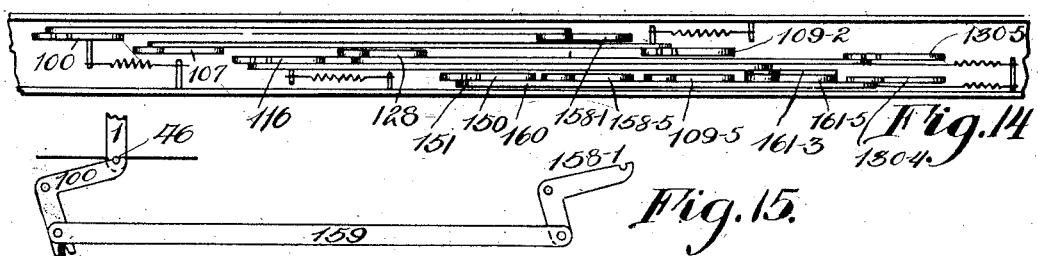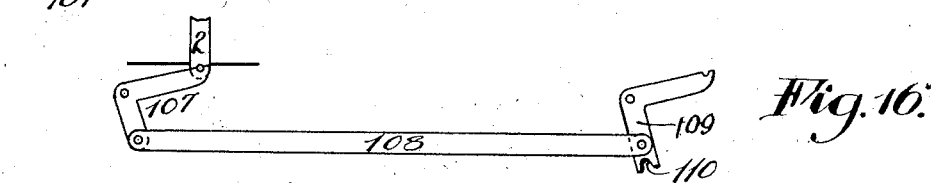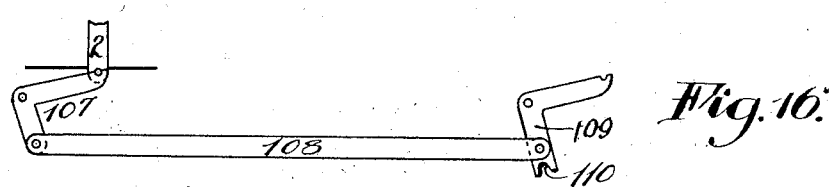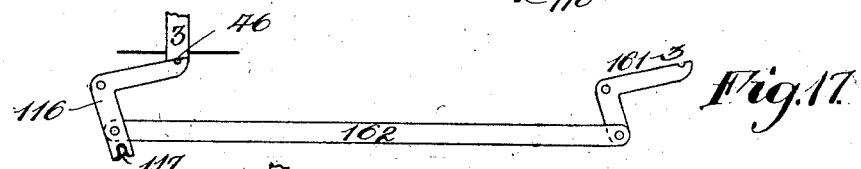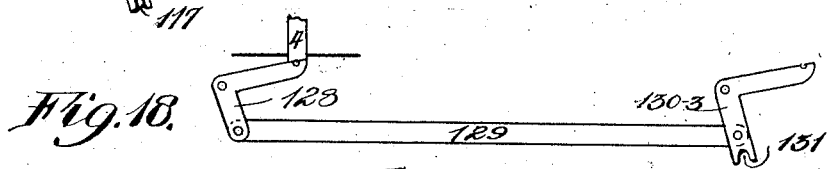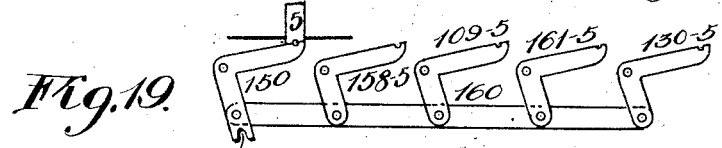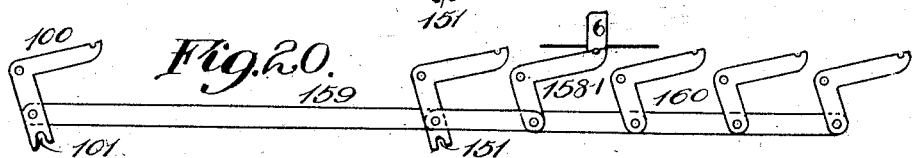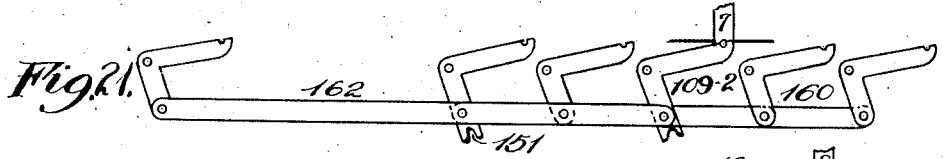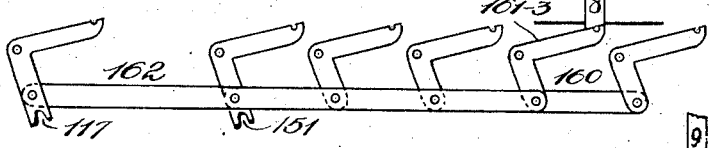

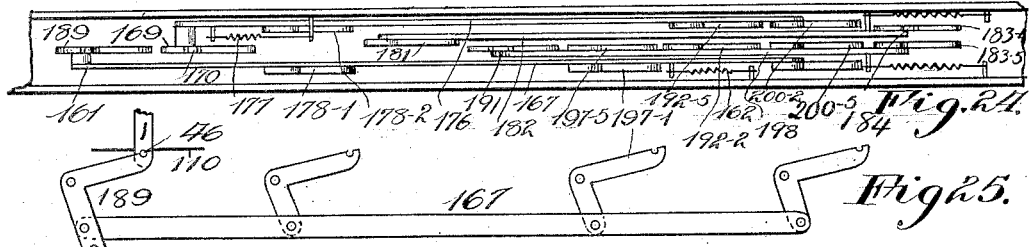
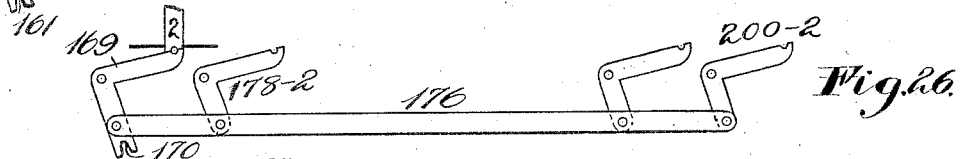
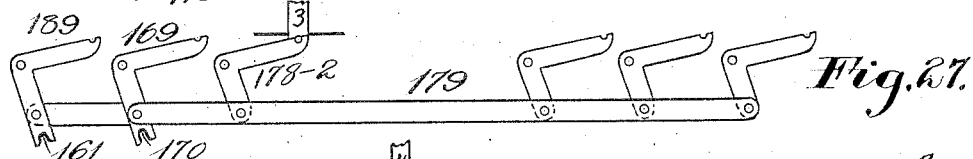
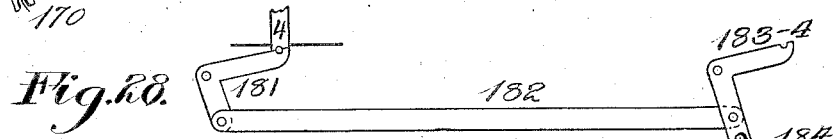
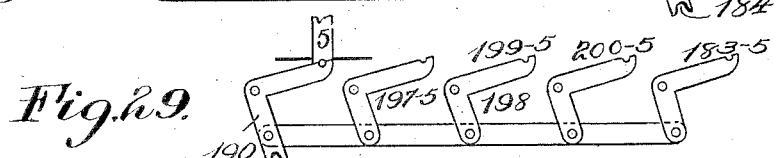
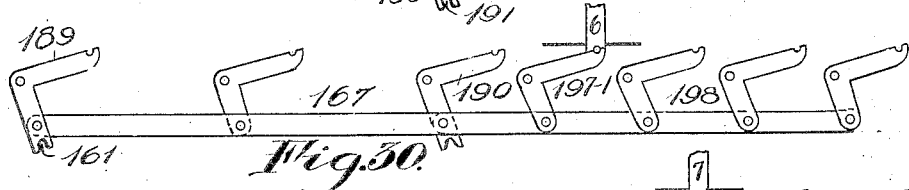
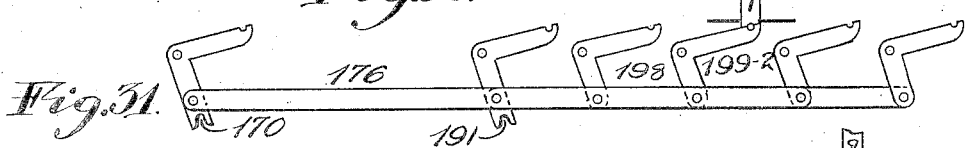
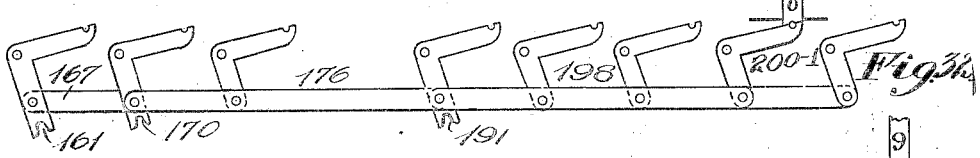
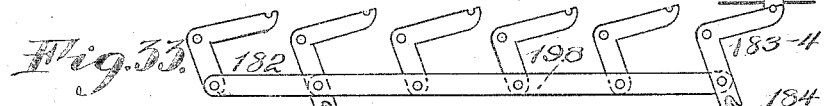

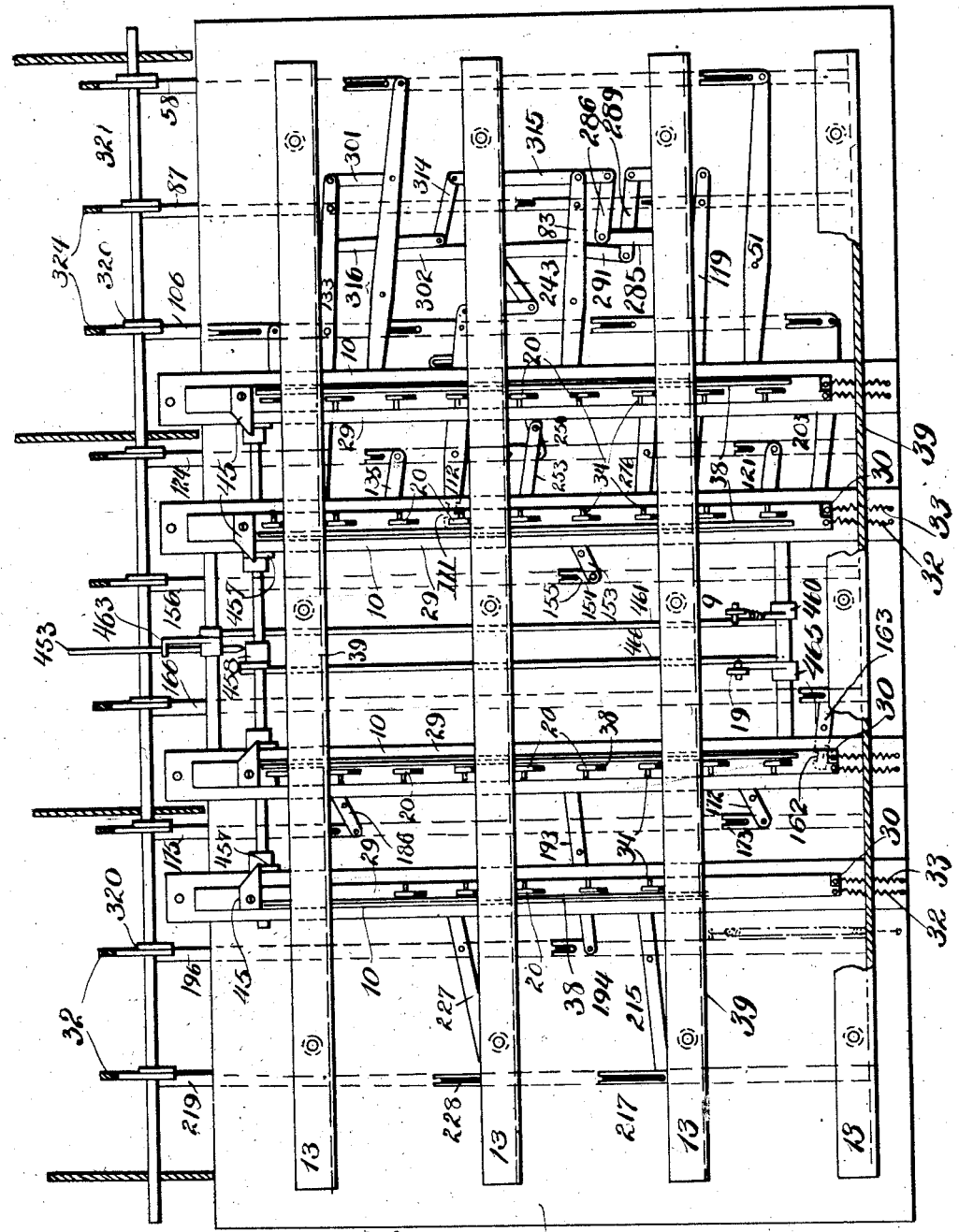

UNITED STATES PATENT OFFICE.

MICHELE GUGLIELMO DE SIMONE, OF NEW YORK, N. Y., ASSIGNOR TO NEW YORK CALCULATING MACHINE COMPANY, INC., A CORPORATION OF NEW YORK.

KEYBOARD MECHANISM.

1,318,135.      Specification of Letters Patent.      Patented Oct. 7, 1919.

Application filed September 30, 1914. Serial No. 864,338.

*To all whom it may concern:*

Be it known that I, MICHELE GUGLIELMO DE SIMONE, a subject of the King of Italy, residing in Stapleton, county of Richmond, city and State of New York, have invented a new and useful Improvement in Keyboard Mechanisms, of which the following is a specification.

An object of the present invention is the provision of mechanism adapted for controlling a series of registers or indicators corresponding to denominational values and a key-board controlling such mechanism comprising keys corresponding to numerical values. In my copending application Serial No. 848,741, filed July 3, 1914, I have disclosed a registering or indicating machine for registering or indicating the denomination or denominations composing any given numerical value represented by the manipulated keys, and the number of such denomination or denominations. In the more preferred forms of such registering and indicating machine, say for monetary values, the registering or indication is given for the minimum number of bills or currency, or both, as the case may be, of which the numerical value represented by the manipulated keys, is composed. For example, taking the monetary value of $27.89, upon manipulating the keys representing such monetary value, the denomination indicators would show the following indications:

$10. $5. $2. $1. 50¢ 25¢ 10¢ 5¢ 1¢
 2   1   1   0   1   1   1   0   4

The present invention relates more particularly to selective mechanism controlled by the keys, such selective mechanism controlling certain actuating members corresponding to the respective denominations, whereby upon manipulation of the keys representing any given monetary value, the actuating member or members corresponding to the denomination or denominations of which such numerical value is composed, are operated to an extent or extents, corresponding to the particular number of the denomination or denominations.

The key-board, in its most preferred form, comprises banks of keys arranged in decimal relation, each key bearing a single integer, and the selective arrangement divided into groups corresponding to such banks of keys, each group of selective mechanism being connected with the keys in differential relation to provide for the required ranges of extent of operation corresponding to the required particular numbers of the respective denominations. As an example, in monetary values, taking the monetary value of 20¢, upon depressing the "2" decimal cent key, the indication "2" would appear on the dime indicator or be registered by the dime register, whereas upon manipulation of the "1" key of the decimal cent bank, the indication "1" would appear or be registered. For a "5¢" value, the "5" key of the unit cent bank of keys is manipulated and the indication "1" would appear on the nickel indicator or be registered by the nickel register.

In the mechanism, known as "analyzing" mechanism, set forth in my aforesaid copending application Serial No. 848,741, upon manipulating the keys for a 25¢ value, the indication, or register, of the dime and nickel indicators, or register, is canceled and the indication "1" is caused to appear on the 25¢ indicator, or register by the 25¢ register.

In the preferred forms of my invention, the keys are made of uniform construction, and the levers, usually bell crank levers, are also of uniform construction. In such preferred forms, the desired actuation of such operative parts is effected by suitable connection means between such operative parts and their respective actuation levers whereby, upon uniform stroke of such keys the desired predetermined movements of such operative keys are secured.

Preferably, also the key-board is grouped into several banks, and each bank of keys and their corresponding levers are mounted on a common support, whereby any bank may be separately removed as an entity for purposes of simplification, repair, etc.

Other features of my invention relate to the provision of resilient means tending to restore the keys to neutral position and for restoring the levers and the operative parts controlled thereby to neutral position.

In the preferred form hereinafter described, the levers controlled by the keys are bell crank levers having a pin and notch connection with the same. In such cases where a plurality of keys control the same or common operative part, the desired different actuation of said common operative part by the said keys is effected by arranging the same whereby such common operative parts is differentially actuated. In certain keys, such differential actuation is effected by pivoting the bell crank levers in constant relation to such common operative part and by arranging the distance between such pivoted connections relative to the oscillating points of such bell crank levers whereby one bell crank lever is actuated for the full stroke of its key and another bell crank lever is actuated only during part of the stroke of its key. In other cases such differential actuation of the common operative part is effected by connecting a bell crank lever in constant relation to said common operative part and by connecting another bell crank lever in inconstant relation to such operative part, such as by a pin and slot connection.

Further features reside in automatic means for releasing the manipulated keys to normal position; the provision of simple and effective means for arranging the resilient means for the keys of the several banks and other provisions for simplification in construction, positiveness in action, readability in replacement of parts, and adaptability in removing the portions of the mechanism from one another.

Other features and objects of my invention will be more fully understood from the following description and accompanying drawings, in which—

Figure 1 is a plan view of a bank of keys adapted for use in a preferred form of device;

Fig. 2 is a side elevation of Fig. 1;

Fig. 3 is a side elevation taken on line 6—6 of Fig. 6;

Fig. 4 is a bottom plan view of the bank of keys shown in Fig. 1; with certain parts removed;

Fig. 5 is an end elevation of Fig. 3, as seen from the left;

Fig. 6 is a transverse section taken on line 9—9 of Fig. 3, viewed in the direction of the indicating arrows;

Figs. 7, 8, 9, 10 and 11 are detail views in side elevation, illustrating the relation of particular keys of unit cent values, and mechanism controlled respectively thereby;

Figs. 12 and 13 are detail sectional elevations illustrating two keys of a bank of keys, having particular reference to the locking and release mechanism thereof;

Fig. 14 is a detail bottom view of a portion of the bank of keys corresponding to decimal cent values of the denominator machine shown in preceding figures;

Figs. 15 to 23 are detail side elevations indicating the relation of particular keys of decimal cent values and mechanism controlled respectively thereby;

Fig. 24 is a detail bottom plan view of a portion of the bank of keys corresponding to unit dollar values of the aforesaid denominator machine;

Figs. 25 to 33 inclusive, are detail views in side elevation of particular keys of unit dollar values, and mechanism respectively controlled thereby;

Fig. 34 is a detail bottom plan view of a portion of the bank of keys corresponding to decimal dollar values of the aforesaid denominator machine;

Fig. 35 is a detail view in side elevation of Fig. 34, showing the relation of the particular keys to one another and mechanism controlled thereby;

Fig. 36 illustrates a type of mechanism adapted to be operated by my key-board mechanism.

In general, each bank of keys is mounted as a unit on a frame 10 having feet 11, 11, at the extreme ends, the frame 10 being open at the bottom to permit the levers and other parts of the analysis mechanism to protrude under the said frame 10, see Figs. 1 to 6 and 12. The frame 10 of the four banks of keys are mounted on the base 12 of the forward portion 1 of the machine, as by screws passing through openings in the feet 11 of frame 10. Transverse to the frame 10 and also supported on the base 12, are arranged spaced supporting strips 13 and shown as four in number. Between the unit cent bank of keys and the decimal cent bank of keys is positioned a plate 14 secured by screws or the like to the transverse supporting strips 13. A similar plate 15 is disposed between the unit dollar bank of keys and the decimal dollar bank of keys, and similarly carried by the transverse supporting strips 13. The plates 14 and 15 serve to hold the keys of the key-board in uniform position relative to the base 12 of the forward portion 1 of the denominator machine, as will be more fully described hereinafter. Additional plates parallel to plates 14, 15, are arranged across the supporting strips 13 to support or serve as the top or cover of the forward portion 1 of the machine. If desired, the plate 14, 15 and the said additional plates parallel thereto may be made integral, that is as a single plate.

The keys of the various banks of keys are of substantially the same construction to thereby facilitate adjustment and secure economy in construction and assembling. Referring particularly to Figs. 2 and 3, for example, each key comprises a stem 20 having a reduced upper portion 21 adapted to receive a cap bearing its proper number designation. On opposite sides (Fig. 12) of the stem 20 are provided a lower triangular projection 22 having a base 23 of predetermined width and an altitude 24 of a certain length, and also an upper triangular projection 25, in reverse position to that of the projection 22. The base 26 of triangular projection 25, is substantially equal to the base 23 of projection 22, but the altitude 27 of projection 25 is greater than altitude 24 of projection 22; in the specific form illustrated the altitude 27 is about twice the altitude 25. As will be seen from Figs. 3 and 12, the lower projection 22 normally is positioned within the opening 28 of upper slide bar 29, the latter extending longitudinally at the top of frame 10. The slide bar 30 is disposed below and parallel to the slide bar 29. Normally the slide bars 29 and 30 are held against the stop 31 by suitable tension means, such as the respective springs 32, 33.

The normal upper or undepressed position of each key is determined by a stop 34 disposed toward the top of each stem 20, said stop 34 coöperating with plate 14, in the case of the banks of keys of unit cent and decimal values, and in coöperation with plate 15, in the case of the keys of the banks of unit dollar and decimal dollar values. Each stem 20 of the keys is also provided with an abutment 35 for receiving an end of a coil spring 36, the other end 37 of spring 36 being passed through a rod 38 carried by the transverse supporting plates 13 and at right angles thereto (see Fig. 2); specifically, the four rods 38 each pass through openings in a flange 39 on the lower side of the respective transverse supporting plates 13. This construction is advantageous since the upper ends of the springs 36 in any bank of keys are successively threaded by pushing its rod 38 therethrough.

It will be noted that upon the depression of any key, the same is positively limited in its downward movement of operation by its projection 23, encountering the plate, shown in Fig. 6, positioned below and in substantial parallelism with slides 29, 30. As shown, such projections of the respective keys are in their upper or undepressed positions and disposed at substantially equal distances from the aforesaid plate, thereby providing for the uniform extent of operation or manipulation of the keys of the key-board, as referred to hereinafter.

It will be noted that the preferred form of the invention illustrated in the drawings embodies keys in the several banks numbered beginning with "1" and ending with "9", and that no "0" key is employed. In the claims I have employed the expression "to solely single unit numbers" or similar expressions to connote that the key-board defined thereby comprises keys solely corresponding to values beginning with 1 and ending with 9 for the respective unit cent, decimal cent, unit dollar and other banks or sets of keys, thereby avoiding the need of keys corresponding to double or triple or other multiple numbers. Such expression also connotes that no zero key is included in the respective banks and that the mechanism operated by the keys effects the desired actuation without the operation or manipulation of any such zero key.

Taking the bank of unit cent values as an illustration, as shown in Fig. 3, and comparing said figure with Figs. 12 and 13, it will be seen that as any key, say key "1" is being pushed downwardly, the projection 22 passes out of the opening 28 in slide 29 into and through opening 40 of lower slide 30. As this movement progresses, the lower edge of projection 25 encounters the edge 41 of upper slide 29 causing slide 29 to move gradually to the right. The lower edge of projection 25 in this movement also encounters the edge 42 of lower slide 30 causing slide 30 to also move to the right. When the edge 26 of projection 25 is below the upper slide 29, by action of its spring 32 the slide 29 is moved to the left and the key becomes held in locked position by the edge 26 of projection 25 being caught below upper slide 29, while the lower slide 30 is maintained in its extreme right hand position, causing the edges 43 of the openings 40 of the lower slide 30 to be held under the projection 22 of the other keys belonging to the same bank, thereby locking said other keys of the same bank and thus preventing any of said other keys from being depressed or otherwise manipulated, as is shown in Fig. 13. In the specific construction illustrated, the upper projection 25 begins on a line approximately coincident with the apex of lower projection 22. The opening 28 is chosen of such length as to provide a proper clearance to allow projection 25 to pass through openings 28, whereby the edges 44 of openings 28 will not encounter the projection 22 of the remaining keys of the same bank.

At or near the lower end of each key is provided an extension or projection 46 adapted to positively engage one or more bell cranks or equivalent means for actuating the mechanism controlled by the key-board. In the specific embodiment illustrated, I have employed bell crank levers of substantially the same form and dimensions, wherever employed, excepting that certain bell crank levers, as more particularly described hereinafter, are provided with additional means, such as forks, constructed to receive and actuate suitable parts of the mechanism controlled by the key-board. The employment of bell crank levers, pivotally mounted on the frame 10, is for the purpose of securing the transmission of orthogonal movement from the keys to the mechanism controlled by the key-board.

For the purpose of securing a highly sensitive touch, I prefer to provide an equal depression stroke to the keys of the keyboard, and to compensate for unequal movement of the parts actuated by the keys, as will be explained hereinafter.

*Unit cent bank of keys.*—This bank of keys comprises nine keys numbered successively from "1" to "9" inclusive. For the purpose of simplification in construction and for other considerations, the bell crank levers of these nine keys are assembled into three groups, to wit, the first group comprising the bell crank levers operated by keys "1", "2", "6" and "7", the second comprising the bell crank levers operated by keys "3", "4", "8", and "9" and the third comprising bell crank levers operated by keys "3", "6", "7", "8" and "9".

Such arrangement of grouping the bell crank levers attains the object of reducing the number of the operating levers and other parts of the mechanism to the lowest possible minimum, as will be more fully set forth hereinafter.

Referring now to the first group (see Fig. 7) key "2" is provided with the projection 46 adapted to engage the arm 47 of bell crank lever 48. Such arrangement secures a uni-directional connection between the key and its corresponding bell crank levers. The lower end of bell crank lever 48 is provided with the fork 49 adapted to embrace the neck 50 of a suitable element such as lever 51 controlling the penny indicator, see Fig. 36. Key "1" is provided with a similar projection 46 adapted to engage arm 53 of bell crank lever 54, the lower arm of bell crank lever 54 being connected by rod 55 to bell crank lever 48. Normally, the rod 55 is held in its extreme right hand position as indicated in Fig. 10 by the spring 52 or other tension element (see Fig. 4) extending from a fixed point of frame 10 to a suitable lug or bar 55. Thus, upon actuation of either key "1" or "2", the lever 51 (Fig. 36) is moved to actuate the rod 58, corresponding to the penny denomination.

For the purpose of attaining the desired indications of the penny indicator corresponding to unit cent keys "1", "2", "6" and "7", the bell crank levers 54 and 48 are connected by rod 55 to corresponding bell crank levers actuated respectively by keys "6" and "7". Such connection is effected by positioning the connecting points 59 and 60 so that the distance between said connecting points 59 and 60 exceeds the distance between the oscillating pivots of bell crank levers 48 and 54 by such amount that the depression stroke of key "1" imparts to the fork 49 a stroke approximately one-half the stroke imparted upon depression of key "2". The bell crank lever of key "6" is arranged relative to the bell crank lever of key "7" similar to the relation of bell crank lever 54 to bell crank lever 48.

Accordingly, in normal position, see Fig. 7, the bottom of the socket 61 of bell crank lever 48 is substantially in contact with projection 46 of key "2", and the bottom of socket 62 of bell crank lever 54 is normally spaced at a predetermined distance below the projection 46 of key "1". Now, when key "2" is depressed, the fork 49, lever 51 and rod 58 are given a stroke producing the indication "2" on the penny indicator. However, when key "1" is depressed the fork 49, lever 51 and rod 38 are given a stroke of less extent producing the indication "1" on the penny indicator.

Similarly, the keys "3" and "4" (see Fig. 8) are arranged with respect to their respective bell crank levers 65, 66; specifically, the bell cranks 65, 66, are respectively connected at 67, 68 to the rod 69 extending longitudinally of the frame 10 and pivotally connected to bell crank 92—3 provided with the fork 71 and to bell crank lever 93—4. Accordingly, upon depressing key "3" to turn bell crank lever 65, the bar 69 is moved to the left (Fig. 8) thereby actuating the lever 73 (see Fig. 36) to produce the indication "3" of the penny indicator. When key "4" is depressed, the bell crank lever 66 is oscillated, thereby moving the bar 69 to the left and also fork 71 to the left (Fig. 8) and the lever 73 to produce the indication "4" on the penny indicator.

The key "5" of the unit cent bank of keys (Fig. 9) is positioned so that its extension 46 engages bell crank lever 80 carrying at its lower end the fork 81. The fork 81 is adapted to operatively engage the cutaway neck 82 (Fig. 36) of lever 83 controlling the rod 87 of the nickel indicator. Accordingly, assuming key "5" to be the solely manipulated key of the unit and decimal cent banks of keys, for reasons set forth hereinafter, the lever 82 will be moved to produce the indication "1" on the nickel indicator.

Since the value of the six cents calls for one penny and one nickel, key "6" (Fig. 10) is provided with two bell crank levers 90—1 and 90—5 (see Figs. 7 and 9) respectively serving to actuate said fork 49 and said fork 81, respectively controlling the penny and nickel indicators. Thus, upon depression of key "6" the fork 49 and thereby the lever 51 is moved to produce the indication "1" on the penny and nickel indicators respectively. It will be noted that key "6" is related to its bell crank 90—1 in the same manner as key "1" is to its bell crank lever 54, and that key "6" is related to its bell crank lever 90—5 the same as key "5" is to its bell crank lever 80.

In a like manner, key "7" (Fig. 10) is provided with two bell crank levers 91—2 and 91—5, key "7" being related to its bell crank lever 91—2 the same as key "2" is to its bell crank lever 48, and key "7" is related to its bell crank lever 91—5 the same as key 5 is to its bell crank lever 80. Accordingly, upon depressing said key "7" the lever 51 (see Fig. 36) is actuated to produce the indication "2" on the penny indicator and the lever 83 is also actuated to produce the indication "1" on the nickel indicator.

Key "8" is similarly provided with two bell crank levers 92—3 and 92—5 respectively controlling fork 71 and fork 81; key "8" is related to its bell crank lever 92—3 similar to key "4" to its bell crank lever 65, and key "8" is related to bell crank lever 92—5 the same as key "5" is to its bell crank lever 80. Accordingly, when key "8" is depressed, the lever 73 and lever 83 are moved to respectively produce the indication "3" on the penny indicator and to produce the indication "1" on the nickel indicator. Similarly, the key "9" is provided with two bell crank levers, one designated 93—4 and controlling fork 71, the other designated 93—5 and controlling fork 81, said bell crank levers respectively corresponding to the bell crank levers of keys "4" and "5". The depression of key "9" moves the fork 71 (Fig. 11) and fork 81 to produce the indication "4" on the penny indicator and the indication "1" on the nickel indicator.

*Decimal cent bank of keys.*—The bank of keys is the second bank on the right hand side of Fig. 36, and to the left of the unit bank of keys. The decimal cent bank also contains keys numbered from "1" to "9". Each key *per se* of this bank is the same as each key of the bank of unit cent values. Similarly, each key of the decimal cent values is provided with one or more bell crank levers, as the case may be, for attaining the desired indications or registrations of the denomination or denominations involved. Referring to Fig. 15, the key "1" controls the bell crank lever 100 provided with the fork 101 adapted to engage the head 102 of lever 103, whereupon depression of key "1" the rod 106 (see Fig. 36) produces the indication "1". Similarly, key "2" controls the bell crank lever 107 pivotally connected by bar 108 to bell crank lever 109 provided with the fork 110, the latter being adapted to engage the head 111 of lever 112. Accordingly, upon depression of key "2" the fork 110 moves the lever 112 and the rod 106 through an extent of actuation to produce the indication "2" on the dime indicator.

Key "3" is provided with a bell crank lever 116 having the fork 117 adapted to engage the head 118 of lever 119, controlling the rod 124 of the quarter indicator and rod 87 of the nickel indicator. Upon depression of key "3" the lever 119 is moved to produce the indication "1" on the quarter indicator and the indication "1" on the nickel indicator.

Key "4" (Fig. 18) is provided with the bell crank lever 128 pivotally connected by bar 129 to bell crank 130—3 provided with the fork 131, the latter being adapted to engage the head 132 of lever 133 (Fig. 36) controlling rod 124 of the quarter indicator, rod 106 of the dime indicator and rod 87 of the nickel indicator. Accordingly, upon depression of key "4" the lever 133 is moved to produce the indication "1" on the respective dials of the quarter, dime and nickel indicators.

Key "5" is similarly provided with the bell crank lever 150 (Fig. 19) said bell crank lever 150 having the fork 151 adapted to engage the head 152 of lever 153 (Fig. 36). The lever 153 controls rod 156 controlling the movable dial of the fifty cent indicator. Thus upon depression of the key "5" the lever 153 is moved to actuate the rod 156 to produce the indication "1" on the fifty cent indicator.

Keys "6", "7", "8" and "9" of the decimal cent values are each provided with two bell crank levers similar to the double bell crank levers provided for the corresponding keys of the unit cent bank of keys. Specifically, the key "6" of the decimal cent values controls the bell crank levers 158—1 and 158—5, the bell crank lever 158—1 being pivotally connected by rod 159 (Figs. 15 and 20) to bell crank lever 100 having the fork 101; the bell crank lever 158—5 is pivotally connected by rod 160 (Figs. 19 and 20) to bell crank lever 150 having fork 151. Accordingly, when key "6" is depressed, the forks 101 and 151 respectively actuate lever 103 and lever 153 to produce the indication "1" on the dime and fifty cent indicators.

Key "7" is similarly provided with bell crank levers 109—2 (Figs. 16 and 21) and bell crank lever 109—5 (Fig. 19) respectively controlling fork 110 and fork 151, whereby the lever 112 and 153 (Fig. 36) are moved to respectively produce the indication "2" on the dime indicator and the indication "1" on the fifty cent indicator.

In like manner, key "8" is provided with two bell crank levers, one designated 161—3 controlling fork 117 by means of rod 162 (Figs. 17 and 22), the other being designated 161—5 controlling fork 151 by rod 160 (Figs. 19 and 22). Accordingly when key "8" is depressed the respective forks 117 and 151 actuate lever 119 and lever 153 whereby to produce the indication "1" on each of the fifty cent, quarter and nickel indicators.

Key "9" is similarly provided with two bell crank levers 130—3 and 130—5 respectively controlling levers 133 and 153 (Figs. 18, 19 and 23). Thus, upon depression of key "9" levers 133 and 153 are moved to produce the indication "1" on each of the fifty cent, quarter, dime and nickel indicators.

*Unit dollar bank of keys.*—Figs. 24 to 33, inclusive, relate to the banks of keys corresponding to unit dollar values. In general, this bank of keys is similar to each of the banks of keys of unit and decimal cent values and also comprises keys indicated from "1" to "9" inclusive.

Key "1" is mounted on the frame 10 to control the bell crank lever 189 by means of the extension 46 of said key. The bell crank lever 189 is provided with the fork 161 adapted to engage the head 162 (Fig. 36) of lever 163 controlling the rod 166 adapted to actuate the dollar indicator. The bell crank lever 189 is pivotally connected to the rod 167 extending longitudinally of frame 10, and is normally held in its right hand extreme position, as indicated in Fig. 25, by suitable tension means such as spring 168 (Fig. 24). Upon depression of key "1" the lever 163 is moved to actuate rod 166 to thereby produce the indication "1" on the one dollar indicator.

Key "2" controls the bell crank lever 169 provided with the fork 170, said fork 170 being adapted to receive the head 171 of lever 172 (Fig. 36) the rod 175 in turn controlling the movable dial of the two-dollar indicator. The bell crank lever 169 is pivotally connected to the longitudinally extending bar 176 held in its normal position by its spring 177. When key "2" is depressed, the lever 172 is moved to produce the indication "1" on the two-dollar indicator.

Key "3" is provided with two bell crank levers, one designated 178—2, (Figs. 26 and 27) pivotally connected by rod 176 to said bell crank lever 169; the other bell crank lever being designated 178—1 is pivotally connected by rod 167 to bell crank lever 189. Accordingly, upon depression of key "3" the rod 166 controlling the one-dollar indicator and rod 175 controlling the two-dollar indicator will be actuated to each produce the indication "1" on the one-dollar and two-dollar indicators.

Key "4" controls the bell crank lever 181 (Fig. 28) connected by rod 182 to bell crank 183—4 having the fork 184, said fork 184 being adapted to receive the head of lever 186 controlling rod 175 in turn controlling the two-dollar indicator (Fig. 36). Upon depression of key "4" thereby actuating fork 184, (Fig. 36) the lever 186 will produce the indication "2" on the two-dollar indicator.

Key "5" controls the bell crank lever 190 (Fig. 29) controlling the fork 191, said fork 191 being adapted to receive the head (Fig. 36) of lever 193, controlling the rod 196, in turn controlling the five dollar indicator.

Accordingly upon depression of key "5" the lever 193 is moved to produce the indication "1" on the five dollar indicator.

Key "6" is provided with two bell crank levers 197—1 and 197—5 (Figs. 29, 30 and 25) said bell crank lever 197—1 operating the fork 161 thereby controlling the lever 163 to produce the indication "1" on the one-dollar indicator. The bell crank lever 197—5 (Fig. 29) is pivotally connected by rod 198 to bell crank lever 190 having the fork 191 thereby controlling lever 193 to produce the indication "1" on the five-dollar indicator.

Similarly, key "7" is provided with two bell crank levers, one designated 199—2 (Figs. 26 and 31) the other designated 199—5 pivotally connected by rod 198 to bell crank lever 190 controlling lever 193. Accordingly, upon depression of key "7" the lever 172 and lever 193 are moved to respectively produce the indication "1" on the two dollar indicator, and the indication "1" on the five-dollar indicator.

Key "8" is provided with three bell crank levers (Fig. 24) one being designated 200—1 (Fig. 25) connected by rod 167 to bell crank lever 189 controlling the rod 166 (Fig. 36) of the one-dollar indicator, another bell crank lever 200—2 (Fig. 26) connected by rod 176 to bell crank lever 169 controlling rod 175 of the two-dollar indicator; and the other bell crank lever designated 200—5 (Fig. 29) connected by rod 198 to bell crank lever 190, controlling the rod 196 of the five dollar indicator. Accordingly, upon depression of key "8" the said three bell crank levers are simultaneously actuated thereby producing the indication "1" on each of the one-dollar indicators, the two-dollar indicator and the five-dollar indicator.

Key "9" (Figs. 24 and 33) is provided with two bell crank levers, one designated 183—4 (Fig. 28) and the other 183—5 (Fig. 29). Bell crank lever 183—4 is provided with fork 184, as above described, controlling the lever 186, and rod 175 of the two dollar indicator, and the bell crank lever 183—5 (Fig. 29) is connected by rod 198 controlling the fork 191, lever 193 and the rod 196 of the five-dollar indicator.

Accordingly, upon depression of key "9" the rods 175 and 196 are respectively actuated to produce the indication "2" on the two-dollar indicator and the indication "1" on the five dollar indicator.

*Decimal dollar bank of keys.*—The bank of keys of decimal dollar value is shown at the extreme left in Fig. 36 and more specifically in Figs. 34 and 35. In the particular type of this bank of keys shown, the keys are arranged for the maximum value of five, to provide with the lower denominational keys for the maximum monetary value of $59.99. For higher value, similar keys of correspondingly higher value are employed, as will be understood.

Referring to Figs. 34 and 35, the respective keys numbered "1", "2", "3", "4", "5", etc., control bell crank levers and associated parts adapted to actuate suitable mechanism of a denomination indicator through extents of movement corresponding to the value of the particular key manipulated.

Key "1" controls the bell crank 210, pivotally mounted in the frame 10, said bell crank 210 being connected by the link 211 to bell crank lever 212 having the fork 213. The link 211 is maintained in the position indicated in Fig. 34 by the spring 214 extending from the link 211 to a fixed point on the frame 10.

Key "2" controls the bell crank lever 212 having the fork 213, said bell crank levers 210 and 212 being related to one another and to their respective keys "1" and "2", similar as aforesaid, to provide the extents of movement of the fork 213 in correspondence to the relative values of keys "1" and "2", to effect the actuation of the ten dollar denominational rod 219 corresponding to the indications "1" and "2" respectively (see Fig. 36).

Key "3" (Fig. 35) controls the bell crank lever 222, pivotally connected by the link 223 to the bell crank lever 224, and controls the fork 225 corresponding to the indication "3". Key "4" controls the bell crank lever 230 connected by the link 223 to the fork 225, the connection of bell crank lever 230 with the link 223 being effected by means of the pin 232 sliding in the slot 236, to control the fork 225 corresponding to the indication "4".

Key "5" directly controls the bell crank lever 224, controlling the fork 225, similarly as aforesaid, to provide for the proper extent of movement of the ten dollar rod 219 for the indication "5".

In a similar manner, the invention is applicable for the control and operation of denominator machines of similar character utilizing other monetary or similar denominations.

Whereas I have described my invention by reference to particular forms thereof, it will be understood that many changes and modifications may be made to attain the objects hereinbefore set forth without departing from my invention.

What I claim and desire to secure by Letters Patent is:—

1. In a device of the character described, a plurality of keys, bell crank levers for said keys, a common element pivotally carried by said bell crank levers, means for connecting certain of said keys in constant relation to said element, and slotted means for connecting certain other of said keys in inconstant relation to said element.

2. In a device of the character described, a plurality of keys, bell crank levers therefor, an element pivotally carried by said keys in common, pivoted means for connecting certain of said keys in constant relation to said element, said means comprising a pin, and means for connecting certain other of said keys in inconstant relation to said element, said means comprising a slot.

3. In a device of the character described, a plurality of keys, levers therefor, a common element pivotally connected to said levers, and means for connecting one of said keys with a lever whereby a portion of the movement of said key is ineffectual with respect to such lever, said connecting means comprising a pin and an open ended slot.

4. In a device of the character described, a plurality of keys, levers therefor and a pin notch connection between certain of said keys and certain of said levers, and a pin and open ended slot connection between other of said keys and other of said levers.

5. In a device of the character described, a plurality of downwardly manipulatable keys, a plurality of superimposed parallel members, one of said members serving as the holding member and the other as the neutral locking member, each key being provided with a projection normally disposed above said neutral locking member to lock the key in neutral position, each key being further provided with a second projection normally disposed above both of said members whereby upon manipulation of the key said second projection effects the movement of both of said members, whereupon the holding member coacts with said second projection to hold the manipulated key in manipulated position, and the neutral locking member is moved into operative relation to the first named projections of the unmanipulated keys to preclude the manipulation of the same.

6. In a device of the character described, a plurality of downwardly manipulatable keys, a plurality of superimposed spring-pressed parallel members, one of said members serving as the holding member and the other as the neutral locking member, each key being provided with a projection normally disposed above said neutral locking member to lock the key in neutral position, each key being further provided with a second projection normally disposed above both of said members whereby upon manipulation of the key said second projection effects the movement of both of said members, whereupon the holding member under action of its spring coacts with said second projection to hold the manipulated key in manipulated position and the neutral locking member is moved into operative relation to the first named projections of the unmanipulated keys to preclude the manipulation of the same.

7. The combination of a key-board comprising manipulatable keys representing numerical values, actuating members corresponding to denominations of monetary values, selective mechanism controlled by said keys and controlling said actuating members for operating the actuating member or members corresponding to such denomination or denominations of which the numerical value represented by the manipulated key or keys is composed and for extent or extents of operation corresponding to the particular number of such denomination or denominations respectively and means for positively limiting the extent of movement of the operated actuating member or members.

8. The combination of a key-board comprising banks of keys arranged in decimal relation, each key representing a single integer value, a set of actuating members corresponding to denominations of monetary values and respectively arranged in correspondence to said banks of keys, and means controlled by said keys and controlling said set of actuating members for operating the actuating member or members corresponding to such denomination or denominations of which the numerical value represented by the manipulated key or keys is composed and for extent or extents of operation corresponding to the particular number of such denomination or denominations and means for positively limiting the extent of movement of the operated actuating member or members.

9. The combination with an actuating member adapted to operate a register or indicator corresponding to a denomination of monetary value, of a plurality of keys corresponding to different numerical values, differential mechanism controlled by certain of said keys for operating said actuating member for respective extents of operation corresponding to the particular number of such denomination of which the numerical values represented respectively by said certain keys are composed, and means for positively limiting the respective extents of movement of said actuating member.

10. The combination with an actuating member adapted to operate a register or indicator corresponding to a denomination of monetary value, of a plurality of keys corresponding to different numerical values, said keys having substantially uniform extents of manipulation, differential mechanism controlled by certain of said keys for operating said actuating member for respective extents of operation corresponding to the particular number of such denomination of which the numerical values represented respectively by said certain keys are composed, and means for positively limiting the respective extents of movement of said actuating member.

11. The combination with an actuating member adapted to operate a register or indicator corresponding to a denomination of monetary value, of a plurality of keys respectively corresponding to different numerical values, differential mechanism controlled by certain of said keys for operating said actuating member for extents of operation corresponding to the particular number of the denomination of which the numerical value represented by said certain keys is composed, and non-resilient means for positively limiting the extent of movement of said actuating member.

12. The combination with an actuating member adapted to operate a ten cent register or indicator, of a group of keys representing decimal cent values, differential mechanism controlled by certain of said keys for operating said actuating member for extents of movement corresponding to the values of one and two respectively, and means for positively limiting the extent of movement of said actuating member.

13. The combination with an actuating member adapted to operate a register or indicator corresponding to one cent values, of a plurality of unit cent keys, differential mechanism controlled by the keys corresponding to values greater than the five cent value for operating said actuating member through a plurality of extents of movement corresponding to the values of one, two, three and four respectively, and means for positively limiting the extent of movement of said actuating member.

14. The combination with an actuating member adapted to operate a multiple dollar denominational value register or indicator, of a group of keys representing dollar values, differential mechanism controlled by keys corresponding to values greater than the two-dollar value for operating said actuating member for extents of movement corresponding to the values of one, and two, respectively, and means for positively limiting the extent of movement of said actuating member.

15. The combination of a group of actuating members corresponding to denominations of monetary values, a group of keys representing numerical values, elements individually controlled by said keys respectively and bars interconnecting said individual elements as sub groups corresponding to the denominational values represented by the numerical values of said group of keys, said bars respectively controlling said actuating members.

16. The combination of a group of actuating members corresponding to denominations of monetary values, a group of keys corresponding to numerical values, elements individually controlled by said keys respectively, links interconnecting said elements as sub groups and means respectively connecting said links with said actuating members.

17. The combination of a group of actuating members corresponding to denominations of monetary values, a group of keys representing numerical values, elements individually controlled by said keys respectively and bars interconnecting said individual elements as sub groups corresponding to the denominational values represented by the numerical values of said groups of keys, said bars respectively controlling said actuating members, and means for positively limiting the extents of movement of said actuating members.

18. The combination of a group of actuating members corresponding to denominations of monetary values, a group of keys corresponding to numerical values, elements individually controlled by said keys respectively, links interconnecting said elements as sub groups, means respectively connecting said links with said actuating members and means for positively limiting the extents of movement of said actuating members.

In testimony whereof I have signed this specification in the presence of two subscribing witnesses:

MICHELE GUGLIELMO DE SIMONE.

Witnesses:
HENRY J. LUCKE,
S. M. BAEDER.